United States Patent
Seki (10) Patent No.: US 8,477,337 B2
(45) Date of Patent: Jul. 2, 2013

(54) PRINTER THAT SELECTIVELY SENDS OR PRINTS DATA ACCORDING TO THE TYPE OF DATA

(75) Inventor: Takao Seki, Nagoya (JP)

(73) Assignee: Brother Kogyho Kabushiki Kaisha, Nagoya-shi (JP)

( * ) Notice: Subject to any disclaimer, the term of this patent is extended or adjusted under 35 U.S.C. 154(b) by 1106 days.

(21) Appl. No.: 12/003,553

(22) Filed: Dec. 28, 2007

(65) Prior Publication Data

US 2008/0158584 A1    Jul. 3, 2008

(30) Foreign Application Priority Data

Dec. 28, 2006  (JP) .................................. 2006-354561

(51) Int. Cl.
    *G06F 3/12*    (2006.01)
(52) U.S. Cl.
    USPC ........................................................ 358/1.15
(58) Field of Classification Search
    USPC ........................................ 358/1.1, 1.14, 1.15
    See application file for complete search history.

(56) References Cited

U.S. PATENT DOCUMENTS

| | | | |
|---|---|---|---|
| 5,933,478 A | 8/1999 | Ozaki et al. | |
| 5,943,068 A | 8/1999 | Ono et al. | |
| 2003/0090697 A1* | 5/2003 | Lester et al. | 358/1.14 |
| 2004/0090527 A1 | 5/2004 | Kanevsky et al. | |
| 2005/0012956 A1* | 1/2005 | Castle | 358/1.15 |
| 2006/0202952 A1 | 9/2006 | Sato et al. | |

FOREIGN PATENT DOCUMENTS

| | | |
|---|---|---|
| EP | 1 499 101 A1 | 1/2005 |
| JP | 8-265245 A | 10/1996 |
| JP | 11-234464 | 8/1999 |
| JP | 2000-312272 | 11/2000 |
| JP | 2004-112146 A | 4/2004 |
| JP | 2005-229520 A | 8/2005 |

OTHER PUBLICATIONS

JP Office Action dtd Nov. 16, 2010, JP Appln. 2006-354561, English translation.
European Search Report issued in European Patent Application No. EP 07 25 5079, mailed Mar. 27, 2008.
JP Office Action dtd Feb. 22, 2011, JP Appln. 2006-354561, English translation.

* cited by examiner

*Primary Examiner* — Jeremiah Bryar
(74) *Attorney, Agent, or Firm* — Banner & Witcoff, Ltd.

(57) ABSTRACT

An information processing device includes a data receiving device, an output processing device, a print processing device, a specifying device, and a process controller. The information processing device is to be connected with a portable device. The data receiving device receives data. The output processing device is capable of executing an output process of outputting the received data to the portable device. The print processing device is capable of executing a print process of printing the received data. The specifying device specifies the type of received data. The process controller controls the output processing device and the print processing device. Either the output process or the print process is executed in accordance with the type of received data specified by the specifying device.

9 Claims, 8 Drawing Sheets

PRINTER THAT SELECTIVELY SENDS OR PRINTS DATA ACCORDING TO THE TYPE OF DATA

CROSS-REFERENCE TO RELATED APPLICATION

This application claims priority to Japanese Patent Application No. 2006-354561, filed on Dec. 28, 2006, the contents of which are hereby incorporated by reference into the present application.

BACKGROUND OF THE INVENTION

1. Field of the Invention

The present invention relates to an information processing device that receives data and outputs the received data.

2. Description of the Related Art

The Japanese Patent Application Publication No. 2000-312272 discloses a facsimile device that sends data received from an exterior network to a portable device in a case where the portable device is able to display image data. Furthermore, the Japanese Patent Application Publication No. 11-234464 discloses a facsimile device that prints out data received from an external network.

BRIEF SUMMARY OF THE INVENTION

With the technique taught in the aforementioned Japanese Patent Application Publication No. 2000-312272, all of the received data is sent to the connected portable device. While, on the other hand, with the technique taught in the aforementioned Japanese Patent Application Publication No. 11-234464, all of the received data is printed. In the aforementioned techniques, the received data of the facsimile device is outputted by using merely a single output format.

The technique disclosed in the present specification may realize an information processing device that may flexibly adapt to the functions the portable device is equipped with and/or the intention of the user. The data processing device disclosed in the present specification may alter the output formats of the received data in accordance with the types of received data.

The information processing device disclosed in this specification is to be connected with a portable device. The term "portable device" should be interpreted within its broadest definition. That is, the term "portable device" described in the present specification includes not only portable devices such as a cellular phone having a display or a controller, but also portable devices such as portable memory having merely a storage function.

Figure 1:
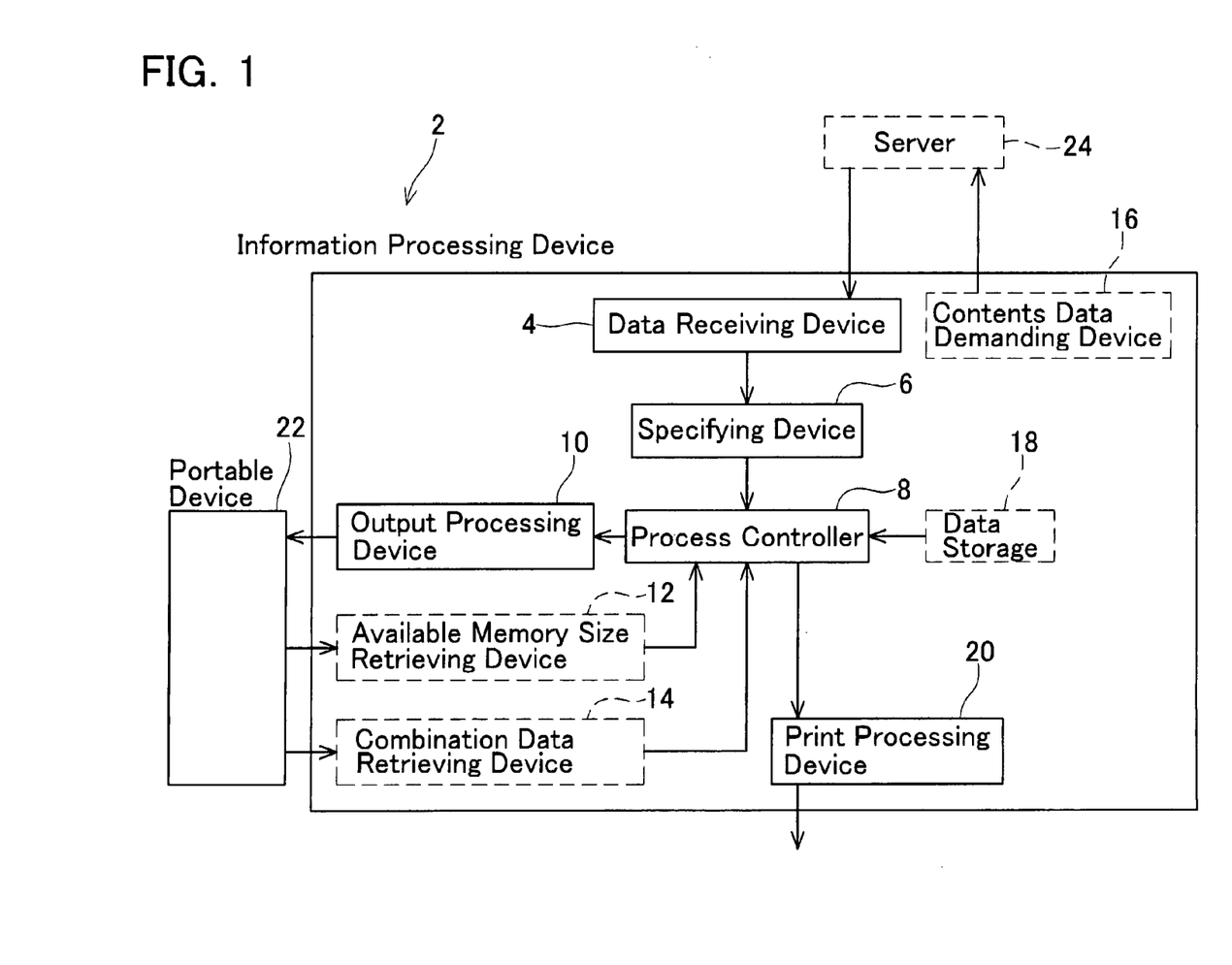
FIG. 1 shows a schematic view of an information processing device.

FIG. 1 shows a schematic plan view of an information processing device disclosed in this specification. FIG. 1 shows a schematic example of the information processing device, with the aim to enhance the understanding hereof. It should be noted that the technique disclosed in this specification will not be interpreted restrictively due to the contents of FIG. 1 and the descriptions quoting FIG. 1.

The information processing device 2 may include a data receiving device 4, an output processing device 10, a print processing device 20, a specifying device 6, and a process controller 8. The information processing device 2 is to be connected with a portable device 22. The data receiving device 4 receives data. The data received by the data receiving device 4 may be sent via an exterior network such as the Internet, or be sent from a memory device or personal computer that is wire or wirelessly connected to the information processing device 2. In this specification, the data received by the data receiving device 4 is referred to as the received data. The output processing device 10 is capable of executing an output process of outputting the received data to the portable device 22. The print processing device 20 is capable of executing a print process of printing the received data. The specifying device 6 specifies the type of received data.

The process controller 8 may control the output processing device 10 and the print processing device 20 in accordance with the type of received data, which is specified by the specifying device 6. Depending on the type of received data specified, the process controller 8 may control the data output processing device 10 and the print processing device 20 such that either the output process or the print process is executed on the received data.

The information processing device 2 may or may not include a printer. In the case of the information processing device 2 including a printer, the print processing device 20 may control the printer to print the received data. Meanwhile, in the case of the information processing device 2 not including a printer, a printer may be connected to the information processing device 2. In such case, the print processing device 20 may send a print order of the received data to the connected printer.

In the aforementioned information processing device 2, the type of received data is specified. Then, the information processing device 2 may execute either an output process or a print process in accordance with the specified type of received data. It can also be said that, the information processing device 2 is able to alter the output formats of the received data, or the process to be executed on the received data. By the alteration of the output format, the information processing device 2 may be able to fulfill the intention of the user or be compatible with the functions with which the connected portable device 22 is equipped.

DETAILED DESCRIPTION OF THE INVENTION

Various types of data exist among the data received by an information processing device. For example, there are types of received data a user wishes to carry along for the user believes it to be more convenient to do so. In such a case, the received data may be stored in a portable device. On the other hand, there are types of received data the user wishes to print out. Furthermore, the type of data received by the information processing device may vary due to reasons regarding restrictions imposed by the functions with which the portable device is equipped. For example, depending on the display function or the storage capacity of the portable device, the types of received data may be distinguished as a type that is able to be stored in the portable device or a type that is not.

More specifically, in a case of data including information on how to get to a certain shop, the data is likely to include image data of maps or the like, and text data of the address, telephone number, and other information regarding the designated shop. After receiving such data of the designated shop by using the information processing device, the user may wish to view the image data in an enlarged scale. Furthermore, the data size of such image data may be considerably large that it may not be able to be stored in the portable device. Meanwhile, the size of the text data is likely to be compact enough to be stored in the portable device. Such text data can be displayed at a legible size on the display screen of the portable device. In addition, there may be users who prefer to carry along the information on the designated shop in the portable device rather than carry along the printouts of such information.

Among the cases described above, it would be reasonable if the output format of the data received by the information device can be altered in accordance with the functions of the portable device to be connected, or with the intention of the user. The technique disclosed in the present specification may flexibly adapt to the functions the portable device is equipped with and/or the intention of the user.

The embodiments are described below. In the embodiments following the first embodiment, descriptions of configuration common to the former embodiments will be abbreviated.

(First Embodiment)

Figure 2:
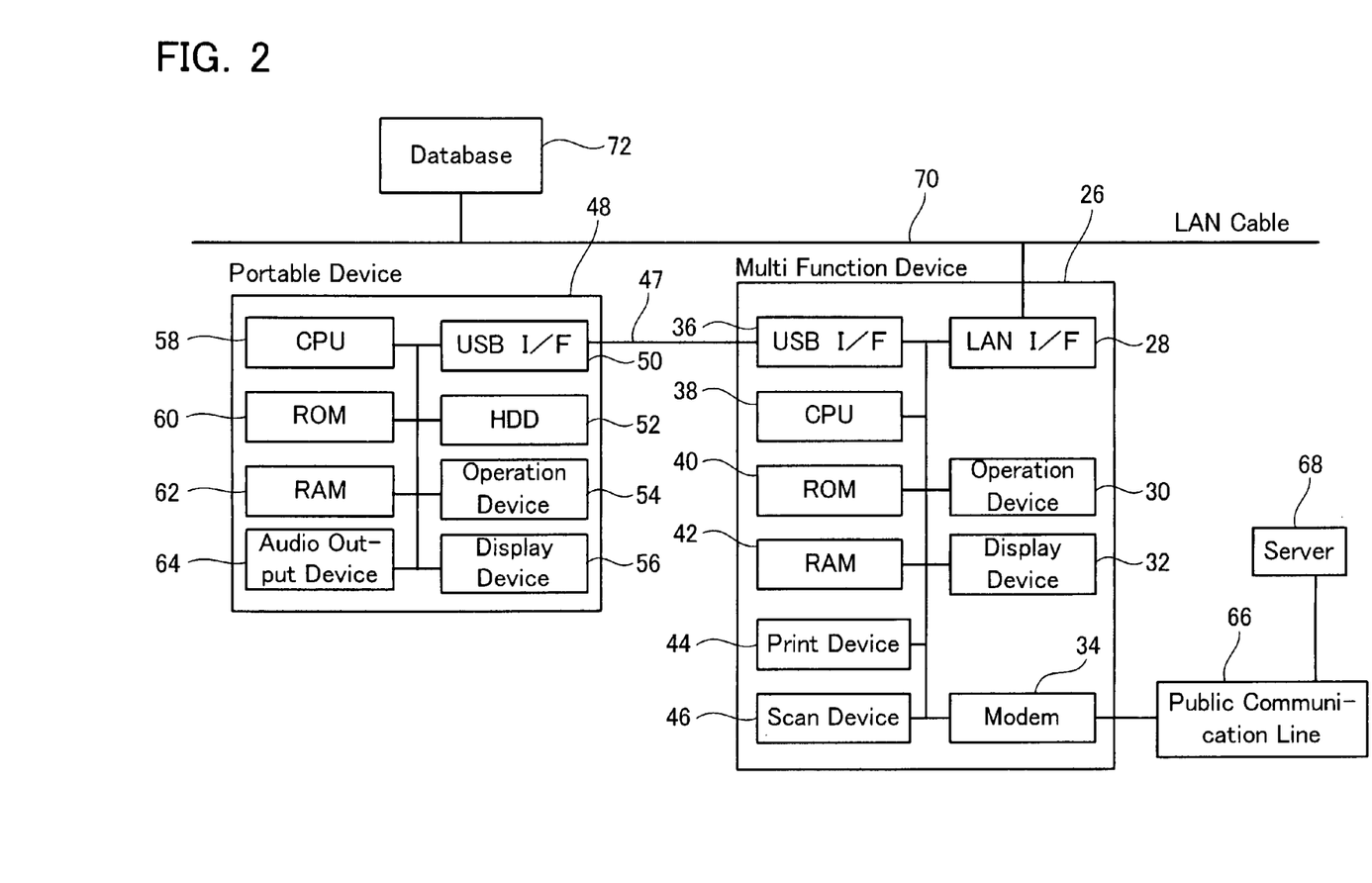
FIG. 2 shows a schematic view of an information processing device and its peripheral devices.

FIG. 2 shows a schematic view of a multi function device 26 and its peripheral devices of the present embodiment. The multi function device 26 includes a LAN interface 28, an operation device 30, a display device 32, a modem 34, a USB interface 36, a CPU 38, a ROM 40, a RAM 42, a printing device 44, and a scanning device 46. The LAN interface 28 is connected to a network via the LAN cable 70. Furthermore, a database 72 is also connected to the network via the LAN cable 70. The multi function device 26 is able to retrieve data that is stored in the database 72 via the network. The operation device 30 includes key pads which the user may operate. The user may operate the operation device 30 to input various types of data to the multi function device 26. The display device 32 is able to display the variety of information thereon. The modem 34 is connected to a public communication line 66; e.g. a telecommunication line. A server 68 is connected to the public communication line 66. The multi function device 26 is able to retrieve data stored within the server 68 via the modem 34 through the public communication line 66. One end of a USB cable 47 is connected to the USB interface 36. The other end of the USB cable 47 is connected to a portable device 48. The multi function device 26 is connected and is able to communicate with the portable device 48 via the USB cable 47.

In the present embodiment, the multi function device 26 and the portable device 48 are connected with the USB cable 47. However, the multi function device 26 and the portable device 48 may be connected wirelessly. For example, the multi function device 26 and the portable device 48 may be connected by a wireless LAN, or the like.

The ROM 40 stores programs that are to be processed by the CPU 38. The CPU 38 controls the processes executed by the multi function device 26 in accordance with the programs stored in the ROM 40. The RAM 42 is capable of storing various types of data temporarily. The print device 44 is capable of executing the print process of printing data. The scanning device 46 is capable of scanning a document and preparing image data of the scanned document.

The portable device 48 includes a USB interface 50, a hard disc 52, an operation device 54, a display device 56, CPU 58, ROM 60, RAM 62, and an audio output device 64. One end of the USB cable 47 is connected to the USB interface 50. The portable device 48 is connected to the multi function device 26 by the USB cable 47. The hard disc 52 is able to store various types of data. The operation device 54 includes keypads to be operated by the user. The user can input a variety of information by operating the operation device 54. The display device 56 is able to display a variety of information.

The ROM 60 stores programs that are to be processed by the CPU 58. The CPU 58 controls the processes executed by the portable device 48 in accordance with the programs stored in the ROM 60. The RAM 62 is capable of storing various types of data temporarily. The audio output device 64 is capable of playing the audio data stored on the hard disc 52 and output the sound thereof. The portable device 48 of the present embodiment is equipped with a music playing function. However, the portable device 48 is not restricted to such a type. The portable device 48 only needs to be capable of inputting the data received by the multi function device 26 and sent therefrom. The portable device 48 may be equipped with other functions, for example, a telecommunication function as in a cellular phone. The portable device 48 may be a device equipped with merely a data storing function, as in a memory stick, a device of which portability is easily realized.

Figure 3:
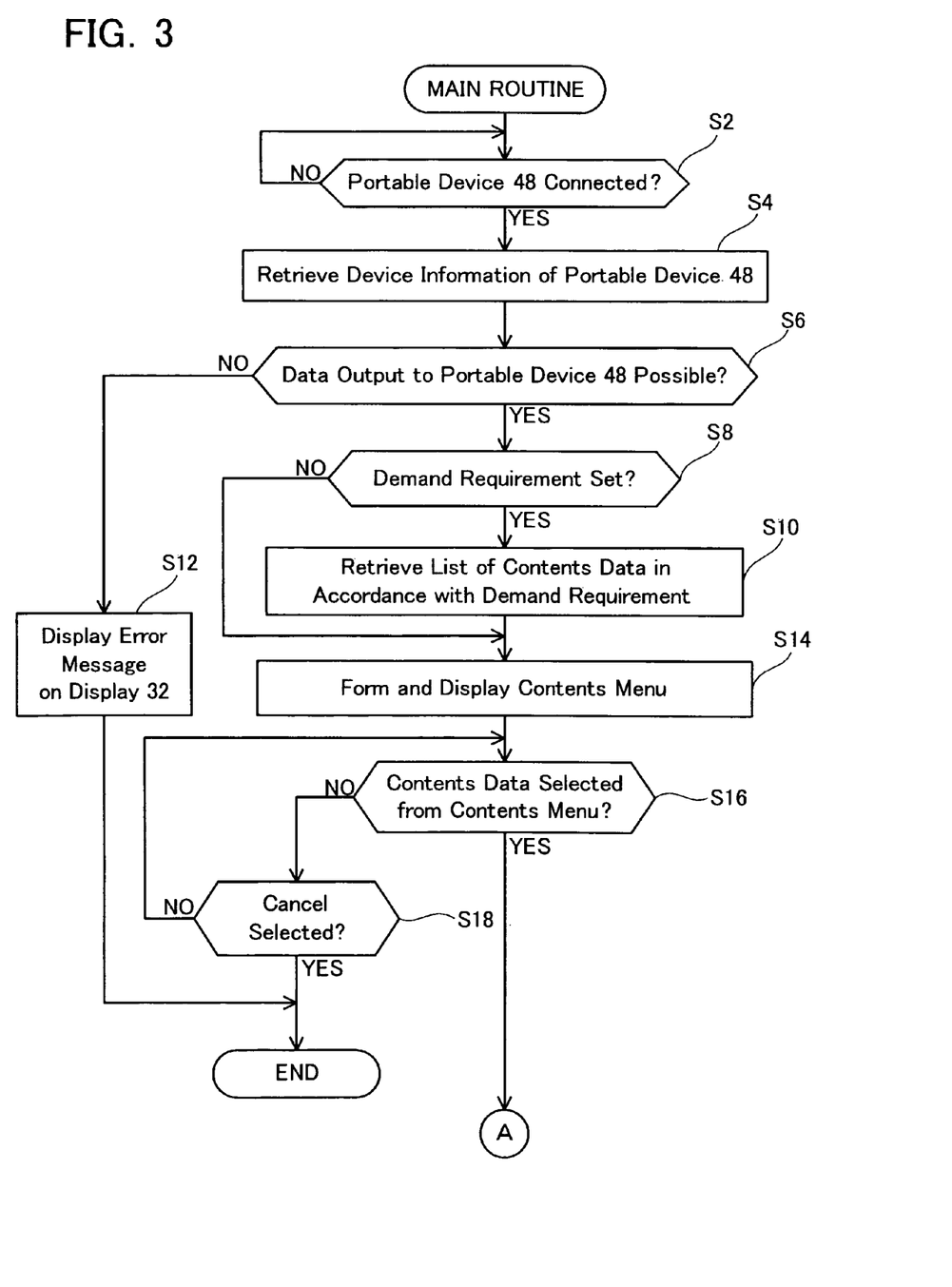
FIG. 3 shows a flow chart of a main routine process.
Figure 4:
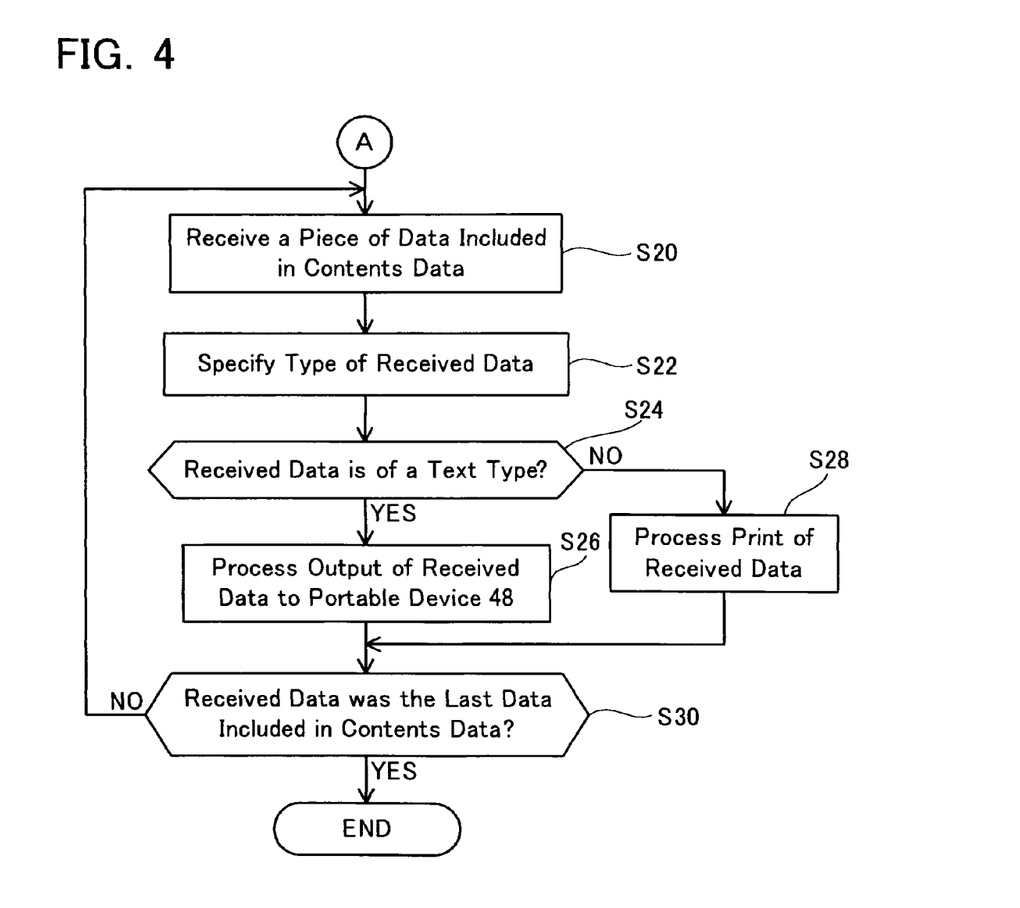
FIG. 4 shows a flow chart of continuing process of the main routine of a first embodiment.

FIGS. 3 and 4 show flow charts of the processes executed by the CPU 38 of the multi function device 26. The main routine of the processes described below is executed when the portable device 48 is connected to the multi function device 26. The CPU 38 and the programs stored in the ROM 40, and other hardware elements comprised by the multi function device 26 work in harmony and realize the processes described below.

The multi function device 26 keeps watch over the connection status with the portable device 48 (step S2). When the portable device 48 is connected via the USB interface 36 ("YES" to step S2), the device information of the portable device 48 is retrieved (step S4). The device information is used to determine whether the portable device 48 is in a condition capable of inputting the received data that will be sent from the multi function device 26. The device information may include information on the power status or the device configuration of the portable device 48. For example, in a case where the power of the portable device 48 is off, or the portable device 48 is not equipped with the necessary device configuration to have the received data inputted from the multi function device 26, the multi function device 26 cannot execute the output process of outputting the received data to the portable device 48. Hence, if reception of the data output from the multi function device 26 to the portable device 48 is not possible ("NO" to step S6), the multi function device 26 displays an error message notifying such condition on the display device 32 (step S12). Then, the process is terminated.

In a case where communication between the portable device 48 and the multi function device 26 is possible ("YES" to step S6), the multi function device 26 determines whether a demand requirement has been set (step S8). The demand requirement designates the kind of data to be demanded from the server 68 or the database 72.

The demand requirement may designate a certain kind of class in which the data is classified within the server 68 or the database 72. For example, the demand requirement can designate classes such as "accommodation facility near the station", or "Restaurant". Furthermore, the demand requirement may designate keywords that are capable of designating a class: e.g., "motel", "Chinese restaurant", or the like.

One or more demand requirements may be set and stored in the multi function device 26. A default demand requirement may be stored. On the other hand, the demand requirement may also be defined and set by the user. For example, the user may operate the operation device 30 of the multi function device 26 and input one or more demand requirements. Moreover, the user may define and set the demand requirement by operating the operation device 54 of the portable device 48. In this case, the demand requirement will be stored in the portable device 48. Hence, in such case, it is preferable that the multi function device 26 is capable of retrieving the demand requirement that is stored in the portable device 48.

In a case where the demand requirement has been set ("YES" to step S8), the demand requirement is sent to the server 68 or the database 72. As a result, a list of contents data that satisfies the demand requirement is retrieved from the server 68 or the database 72 (step S10). More specifically, the demand requirement is sent to the server 68 or the database 72 via the public network 66 or the LAN cable 70 respectively. Then, in accordance with the demand requirement set for the kinds of data demanded by the multi function device 26, contents data that satisfies the demand requirement is extracted from within the server 68 or the database 72.

Contents data is an assembly of one or more data that is to be sent to the multi function device 26 in response to the demand from the multi function device 26. The data that is included in the contents data is related. For example, the contents data demanded by the demand requirement "accommodation facility near the station" includes text data that describes the name, address, features of the accommodation facility, and image data that depicts the front appearance of the said facility, or a map indicating the location thereof. In a case where a plurality of accommodation facilities exists near the station, a plurality of aforementioned contents data is extracted from the server 68 or the database 72. After the contents data is extracted from the server 68 or the database 72, the multi function device 26 retrieves a list of extracted contents data.

Then, the multi function device 26 forms a contents menu based on the retrieved list of contents data and displays the contents menu on the display device 32 (step S14). In this step, in a case where the demand requirement is not set ("NO" to step S8), the multi function device 26 forms and displays a contents menu based on all of the contents data stored on the server 68 or the database 72. For example, if the contents data is classified in a plurality of classes, the initial contents menu includes a list of the aforementioned classes. In either of the aforementioned cases, the contents menu enables the user to select desired contents data therefrom.

In a case where contents data is selected from the contents menu ("YES" to step S16), the multi function device 26 moves to proceed with the process of receiving the selected contents data. On the other hand, in a case where none of the contents data is selected from the contents menu ("NO" to step S16), and cancel is selected ("YES" to step S18), the process is terminated.

With the sequence of the aforementioned processes, the contents data selected from the contents menu is sent from the server 68 or the database 72 to the multi function device 26. Each plurality of data that is included in the contents data is sequentially received by the multi function device 26, and stored in the RAM 42.

Processes shown in FIG. 4 are a continuation of step S16 of FIG. 3. After contents data is selected from the contents menu ("YES" to step S16), the selected contents data is sent to the multi function device 26. The data included in the contents data is sent to the multi function device 26 sequentially. Accordingly, in the course of receiving the series of data included in the contents data, the multi function device 26 receives a piece of data that is included in the contents data (step S20). The received data is stored in the RAM 42. Then, the multi function device 26 specifies the type of received data (step S22). In this embodiment, the multi function device 26 specifies whether the received data is of a text type or of an image type.

For example, if the data received in step S20 includes written information such as the name, address and features of an accommodation facility, the received data will be specified as being the text type. On the other hand, if the data received in step S20 includes image information such as a map or a picture of the accommodation facility, the received data will be specified as being the image type. The type of received data can be determined in accordance with its data format.

In a case where the received data is specified as being the text type ("YES" to step S24), the multi function device 26 executes an output process of outputting the received data to the portable device 48 (step S26). As a result, the portable device 48 stores the received data within its storage region. On the other hand, in a case where the received data is specified as being the image type ("NO" to step S24), the multi function device 26 executes a print process of printing the received data (step S28). The print device 44 is controlled by the CPU 38 to carry out the printing of print process.

In a case where the received data that had gone through steps S20 to S28 was the last data included in the contents data ("YES" to step S30), the process is terminated. However, in a case where the received data that had gone through steps S20 to S28 was not the last data included in the contents data ("NO" to step S30), the steps of S20 to S30 are repeated. That is, the next data included in the contents data is received, and the type of received data is specified. Then, either the output process or print process is carried out in accordance with the specified type of received data.

In the present embodiment, the multi function device 26 carries out either the output process or the print process on the received data in accordance with its specified type. In other words, the multi function device 26 is able to carry out distinct processes on the received data in accordance with its specified type. The outputting format of the received data can be altered in accordance with the specified type. For example, as with the contents data of "accommodation facility near the station", the received data of text type, including the name, address, features, or the like regarding the facility, is outputted and stored in the portable device 48. The user may display the aforementioned written information on the display device 56 as the user desires. On the other hand, the received data of image type, including maps and pictures of the facility, is printed on a printing medium such as paper. It is very likely that the size of the display device 56 of the portable device 48 to be generally small. Hence, in such case, it would be more practical and convenient for the user to have the maps and pictures printed on printing mediums that are larger than the display device 56.

Furthermore, the capacity of which the received data can be stored within the portable device 48 is limited. As a result, the portable device 48 may not be able to store large sized data. With the aforementioned configuration of the present embodiment, text type data whose data size is generally small is outputted to the portable device 48, while the image type data whose data size is generally large is not outputted to the portable device 48. Thus, undesirable conditions are effectively prevented, such as the portable device 48 not being able to store the received data sent from the multi function device 26. Moreover, with the aforementioned configuration of the present embodiment, only a part of the contents data is printed. The part of the contents data which was not printed, but instead outputted to the portable device 48, can be stored on the hard disc 52 of the portable device 48. The stored data can be loaded and displayed on the display device 56 at any time the user desires. Thus, the amount of printing can be reduced economically.

The multi function device 26 of the present embodiment specifies whether the received data is of a text type or an image type, and carries out either the output process (as in step S26) or the print process (as in step S28). The process of specifying the type of the received data and the diversion of the process to be carried out can be performed individually as is shown in this embodiment. However, such processes can be performed in combination with other specifying processes and process diversions.

(Second Embodiment)

Figure 5:
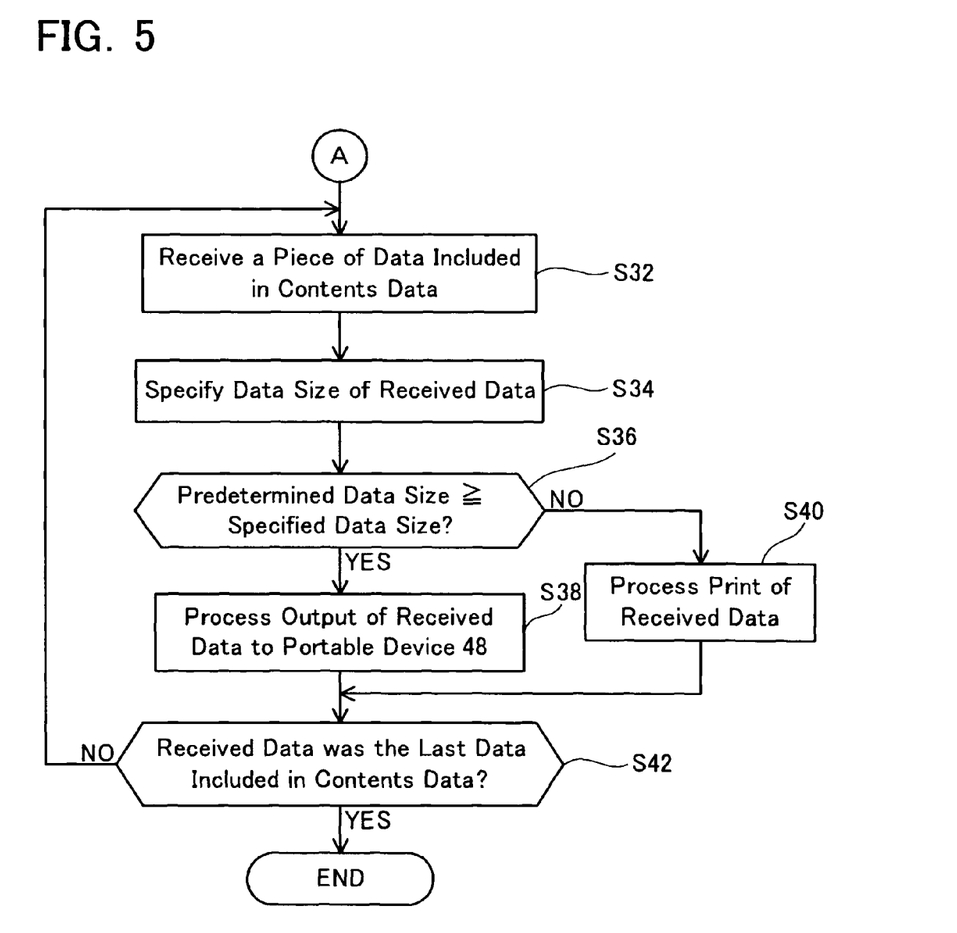
FIG. 5 shows a flow chart of continuing process of the main routine of a second embodiment.

FIG. 5 shows a flowchart of a process the multi function device 26 of the present embodiment performs. The processes shown in FIG. 5 are a continuation of step S16 of FIG. 3. After contents data is selected from the contents menu ("YES" to step S16), the contents data is sent to the multi function device 26. The data included in the contents data is sent to the multi function device 26 sequentially. Accordingly, in the course of receiving the series of data included in the contents data, the multi function device 26 receives a piece of data that is included in the contents data (step S32). Then, the multi function device 26 specifies the data size of the received data (step S34). In other words, in this embodiment, the multi function device 26 specifies the type of received data by its data size.

A predetermined data size is stored in the ROM 40. The predetermined data size can be set as a default, or the user can set it by operating the operation device 30. Furthermore, the predetermined data size can be set in accordance with the device information of the portable device 48. For example, a data size which is small enough to prevent the time required for the output process to be too long can be adopted. In such a case, the user is freed from the boresome and unpleasant waiting time of the output process to be terminated.

In a case where the specified data size of the received data is equal to or smaller than the predetermined data size ("YES" to step S36), the multi function device 26 processes an output process of outputting the received data to the portable device 48 (step S38). The received data is sent to the portable device 48 via the USB interface 36 and 50. As a result, the portable device 48 stores the received data within its storage. On the other hand, in a case where the specified data size of the received data is larger than the predetermined data size ("NO" to step S36), the multi function device 26 processes a print process of printing the received data (step S40). The print device 44 is controlled by the CPU 38 to carry out the printing of the received data.

In a case where the received data that had gone through steps S32 to S40 was the last data included in the contents data ("YES" to step S42), the process is terminated. However, in a case where the received data that had gone through steps S32 to S40 was not the last data included in the contents data ("NO" to step S42), steps S32 to S42 are repeated. That is, the next data included in the contents data is received, and the data size of the received data is specified. Then, either the output process or the print process is carried out in accordance with the specified data size of the received data.

In the present embodiment, the multi function device 26 carries out either the output process or the print process on the received data in accordance with its specified data size. That is, the type of received data is determined by the data size. It can be said that the multi function device 26 is able to carry out distinct processes on the received data in accordance with its specified type. In the present embodiment, the outputting format of the received data can be altered in accordance with its specified type. For example, the received data whose data size is so large that it takes quite a while to complete the output process to the portable device 48 can be printed. On the other hand, the received data whose data size is small enough for it to be sent to the portable device 48 within a short time period is outputted to the portable device 48. Hence, undesirable conditions can be prevented, such as the user having to wait for the boresome and unpleasant output process to be completed. Thus, convenience for the user is enhanced.

The multi function device 26 of the present embodiment specifies whether the data size of the received data is larger or smaller or equal to the predetermined data size (as in step S34), and carries out either the output process (as in step S38) or the print process (as in step S40). The process of specifying the type of received data and the diversion of the process to be carried out can be performed individually as is shown in this embodiment. However, such processes can be performed in combination with other specifying processes and process diversions.

(Third Embodiment)

Figure 6:
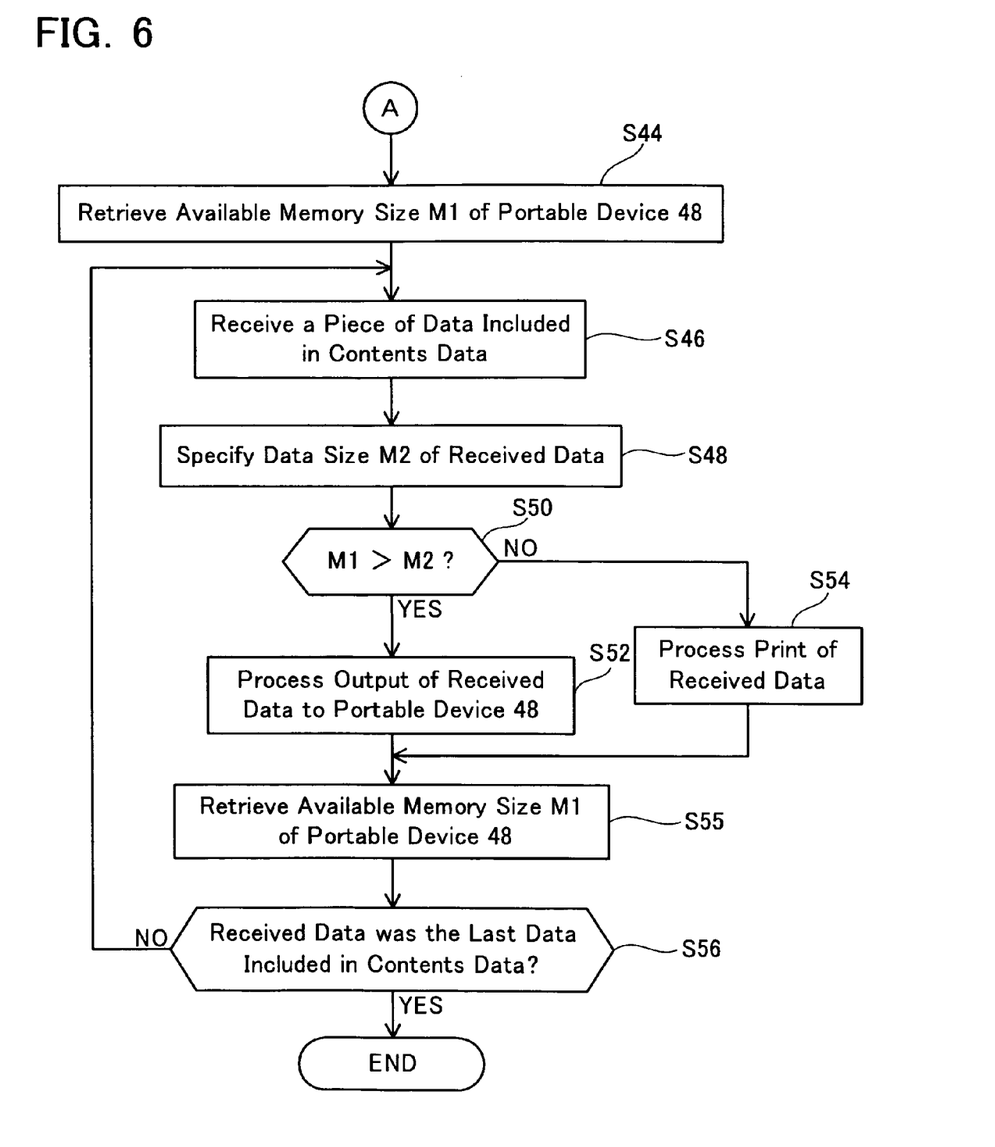
FIG. 6 shows a flow chart of continuing process of the main routine of a third embodiment.

FIG. 6 shows a flowchart of processes the multi function device 26 of the present embodiment performs. The processes shown in FIG. 6 are a continuation of step S16 of FIG. 3. After contents data is selected from the contents menu ("YES" to step S16), the multi function device 26 retrieves an available memory size M1 from the portable device 48 (step S44). The available memory size M1 is the size of the memory capacity of the portable device 48 that can be used for storing the received data to be sent to the portable device 48. The retrieved available memory size M1 is stored in the RAM 42.

Then, the data included in the contents data are sent to the multi function device 26 sequentially. Accordingly, in the course of receiving the series of data included in the contents data, the multi function device 26 receives a piece of data that is included in the contents data (step S46). Then, the multi function device 26 specifies the data size M2 of the received data (step S48). In this embodiment, the multi function device 26 specifies the type of received data by its data size.

Then, the multi function device 26 compares the available memory size M1 retrieved from the portable device 48 and the data size specified of the received data (step S50). In a case where the available memory size M1 is larger than the specified data size M2 ("YES" to step S50), the multi function device 26 executes an output process of outputting the received data to the portable device 48 (step S52). In such case, the portable device 48 is able to store the received data within its storage, for the data size M2 of the received data is confirmed to be smaller than the available memory size M1 thereof. On the other hand, in a case where the specified data size M2 of the received data is equal to or larger than the available memory size M1 ("NO" to step S50), the multi function device 26 executes a print process of printing the received data (step S54).

After either of the processes of step S52 or step S54 is performed, the multi function device 26 again retrieves the available memory size M1 from the portable device 48 (step S55). The available memory size M1 of the portable device 48 may have changed from the value retrieved beforehand by step S44 due to the output process of the received data of step S52.

In a case where the received data that had gone through steps S46 to S55 was the last data included in the contents data ("YES" to step S56), the process is terminated. However, in a case where the received data that had gone through steps S46 to S55 was not the last data included in the contents data ("NO" to step S56), steps S46 to S56 are repeated. That is, the next data included in the contents data is received, and the data size M2 of the received data is compared with the available memory size M1 of the portable device 48. Then, either the output process or print process is carried out in accordance with the result of the aforementioned comparison.

In the present embodiment, the output process of the received data is carried out if the received data is of a size that can be stored within the available storage of the portable device 48. On the other hand, the print process of the received data is carried out if the received data is of a size that cannot be stored within the available storage of the portable device 48. Undesirable conditions such as the portable device 48 not being able to store the received data that is sent from the multi function device 26 can surely be prevented.

In the present embodiment, the multi function device 26 retrieves the available memory size M1 of the portable device 48 each time either of the processes of step S52 or S54 is processed (that is, in step S55). However, the available memory size M1 of the portable device 48 can be calculated from the memory size M1 that is initially retrieved in step S44. In such case, each time the received data is outputted to the portable device 48, the specified data size M1 is subtracted from the available memory size M1.

Furthermore, in the present embodiment, the available memory size M1 is retrieved (that is, in step S44), after a certain contents data is selected. However, retrieval of the available memory size M1 is not restricted to the above timing. For instance, the available memory size M1 can be automatically retrieved when the portable device 48 is connected to the multi function device 26.

The multi function device 26 of the present embodiment specifies whether the data size M1 of the received data is larger or smaller or equal to the available memory size M2 of the portable device 48 (as in step S50), and carries out either the output process (as in step S52) or the print process (as in step S54) in accordance with the comparison of the data size. The process of specifying the type of the received data and the diversion of the process to be carried out can be performed individually as is shown in this embodiment. However, such processes can be performed in combination with other specifying processes and process diversions.

(Fourth Embodiment)

Figure 7:
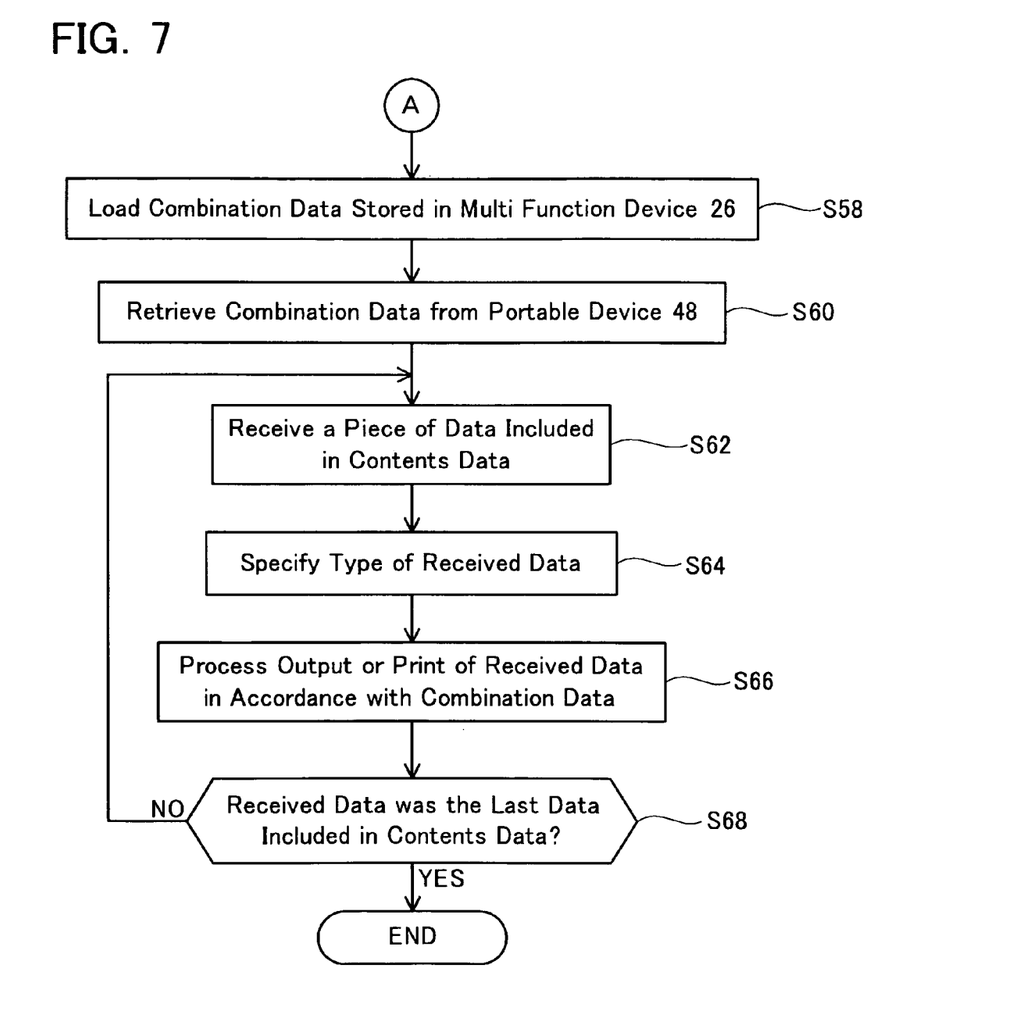
FIG. 7 shows a flow chart of continuing process of the main routine of a forth embodiment.

In the present embodiment, a plurality of combination data is stored in a data storage area that consists of the ROM 40 and the RAM 42. The combination data signifies a combination of a type of received data and a type of process to be executed. The user is able to input such combinations into the multi function device 26 by operating the operation device 30. More specifically, a type of received data to be combined with the output process or the print process can be inputted. In the present embodiment, the output process is combined with the text type data, while the print process is combined with the image type data. Such combination data is stored in the multi function device 26.

Furthermore, the combination data can also be stored in a storage area consisting of the ROM 60 and the RAM 62 of the portable device 48. The combination data stored in the portable device 48 also signifies a combination of a type of received data and a type of process to be executed (that is, either the output process or the print process). The user is able to input such combinations into the portable device 48 by operating the operation device 54. As was in the case of the multi function device 26, the output process is combined with the received data of text type, while the print process is combined with the received data of image type. Such combination data is stored in the portable device 48. FIG. 7 shows a flowchart of processes of which the multi function device 26 of the present embodiment performs. The processes shown in FIG. 7 are a continuation of step S16 of FIG. 3.

After contents data is selected from the contents menu ("YES" to step S16), the combination data stored in the multi function device 26 is loaded (step S58). In this step, both combinations of data that assigns the combination of the text type and the output process and the combination of the image type and the print process are loaded. Then, the multi function device 26 retrieves the combination data from the portable device 48 (step S60). The aforementioned combination data stored in the portable device 48 is loaded into the multi function device 26. In the present embodiment, identical combination data is stored in the multi function device 26 and the portable device 48. For this reason, the multi function device 26 carries out the process described below while following the instructions signified in the aforementioned identical combination data.

The combination data may be stored in either the multi function device 26 or the portable device 48. For example, the combination data does not need to be stored in the multi function device 26, but merely inputted and stored in the portable device 48. In such case, the multi function device 26 carries out the process described below following the combination data that is retrieved in step S60 from the portable device 48. Or, on the other hand, the combination data may only be stored in the multi function device 26, and the portable device 48 may not have the combination data stored. In such case, the multi function device 26 carries out the process described below by following the combination data that is stored within itself by loading them in the step of S58.

Furthermore, in a case where different combination data is stored in the multi function device 26 and the portable device 48, it is preferable that a priority be assigned as to which of the combinations takes precedence. For example, the user may assign the combination data stored in the portable device 48 to take precedence over the combination data stored in the multi function device 26. In this case, the multi function device 26 can carry out the process described below by following the instructions of the combination data that takes precedence.

The data included in the contents data is sent to the multi function device 26 sequentially. Accordingly, in the course of receiving the series of data included in the contents data, the multi function device 26 receives a piece of data that is included in the contents data (step S62). Then, the multi function device 26 specifies the type of received data (step S64). In this step, the multi function device 26 specifies whether the received data is of a text type or an image type.

Then, the multi function device 26 processes either the output process or the print process of the received data in accordance with the type of process that is combined with the specified type of the received data (step S66). In this step, the multi function device 26 determines the type of process that is combined with the type of received data in the loaded combination data. Then, in accordance with the type of process determined, either the output process or the print process is executed. In the present embodiment, the output process is executed on the received data of text types, while the print process is executed on the received data of image types.

In a case where the received data that had gone through steps S62 to S66 was the last data included in the contents data ("YES" to step S68), the process is terminated. However, in a case where the received data that had gone through steps S62 to S66 was not the last data included in the contents data ("NO" to step S68), steps S62 to S68 are repeated. That is, the next data included in the contents data is received, and the type of received data is specified. Then, the output process or print process is carried out in accordance with the process that is combined with the specified type of received data that is signified in the combination data.

In the present embodiment, either the output process or the print process can be performed on the received data as assigned with the combination data. In a case where the combination data is assigned and set by the user, the outputting format of the received data can be altered in accordance with the intention of the user. The convenience for the user is thus enhanced.

The combinations described above as signified in the combination data are merely examples. Combination data assigning different combinations can be adopted. For example, a combination of data size of the received data and the type of process to be executed (that is, either the output process or the print process) may be assigned in the combination data. For instance, the data size of the received data that is smaller than the predetermined data size can be combined with the output process, while the data size of the received data that is larger than the predetermined data size can be combined with the print process. In such case, the data size of the received data is specified in the process of step S64.

Furthermore, a combination of a received data type being a part of contents data that is received in response to a certain demand requirement and a type of process to be executed on such received data may be adopted. Moreover, a combination of a received data type sent from a certain sender and a type of process to be executed on such received data may be adopted. Moreover, the combinations as described above do not have to be inputted by the user. For example, the combination data which is assumed to meet the intentions of the user may be programmed in the multi function device 26 in advance. Such programming may be done in the process of manufacturing the multi function device 26.

(Fifth Embodiment)

Figure 8:
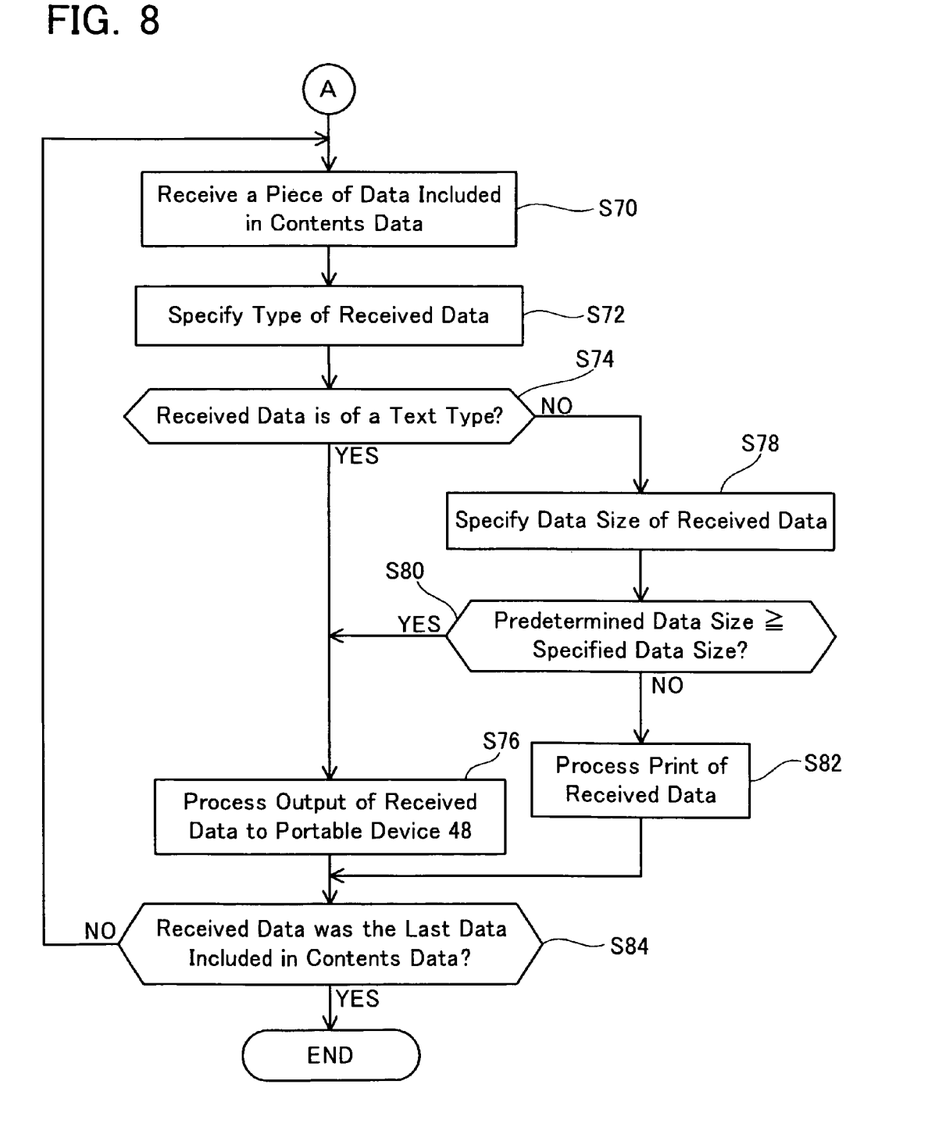
FIG. 8 shows a flow chart of continuing process of the main routine of a fifth embodiment.

In the present embodiment, an example of combining the process of specifying whether the received data is of a text type or an image type for altering the output format and the process of specifying the data size of the received data for altering the output format will be described. FIG. 8 shows a flowchart of processes which the multi function device 26 of the present embodiment performs. The processes shown in FIG. 8 are a continuation of step S16 of FIG. 3.

After contents data is selected from the contents menu ("YES" to step S16), the contents data is sent to the multi function device 26. The data included in the contents data is sent to the multi function device 26 sequentially. Accordingly, in the course of receiving the series of data included in the contents data, the multi function device 26 receives a piece of data that is included in the contents data (step S70). Then, the multi function device 26 specifies the type of received data (step S72). In this step, the multi function device 26 specifies the type of the received data as being the text type or the image type.

For example, if the data received in step S70 includes written information such as the name, address, and features of an accommodation facility, the type of the received data will be specified as being the text type ("YES" to step S74). In this case, the multi function device 26 processes output of the received data to the portable device 48 (step S76). As a result, the portable device 48 stores the received text data. On the other hand, if the data received in step S70 includes image information such as a map or a picture of the accommodation facility, the type of the received data will be specified as being image type ("NO" to step S74). In this case, the multi function device 26 further specifies the data size of the received data (step S78).

A predetermined data size is stored in the ROM 40. In a case where the specified data size of the received data is equal to or smaller than the predetermined data size ("YES" to step S80), the multi function device 26 executes an output process of outputting the received data to the portable device 48 (step S76). On the other hand, in a case where the specified data size of the received data is larger than the predetermined data size ("NO" to step S80), the multi function device 26 executes a print process of printing the received data (step S82).

As a result, of the received data of the image type, those whose data size is larger than the predetermined data size, are printed by the print device 44, while the others whose data size is smaller than or equal to the predetermined data size are outputted to the portable device 48.

In a case where the received data that had gone through the steps of S70 to S82 was the last data included in the contents data ("YES" to step S84), the process is terminated. However, in a case where the received data that had gone through steps S70 to S82 was not the last data included in the contents data ("NO" to step S84), steps S70 to S84 are repeated. That is, the next data included in the contents data is received, and the type of the received data is specified. In the specifying process, the type of the received data is initially specified as being a data of the text type or the image type. Then, the type of the received image data is further specified by its data size. Either the output process or the print process is carried out in accordance with the result of the aforementioned specification.

In the present embodiment, the multi function device 26 carries out either the output process or the print process on the received data in accordance with its specified type (that is, a type of the received data that is determined by the distinction of being the text type or the image type, and also by the data size). In other words, the multi function device 26 is able to carry out an output process on the text type data, and also on relatively small size image type data. In addition, the multi function device 26 is able to carry out a print process on the image type data whose data size is too large for it to be outputted to the portable device 48. The outputting format of the received data can be altered in accordance with its specified type.

The multi function device 26 of the present embodiment specifies whether the received data is of the text type or the image type, and carries out the process of outputting the text type of received data as in step S76. Furthermore, the multi function device 26 of the present embodiment specifies whether the data size of the image type data is larger or smaller or equal to a predetermined data size, and carries out either the output process (step S76) or the print process (step S82) in accordance with the data size. As described in this embodiment, a plurality of specifying processes and process diversions can be performed in combination.

In each of the embodiments described above, the output format of the received data can be changed to meet the intention of the user, or the functions with which the portable device 48 is equipped. Various steps that were not described in the embodiments above may exist in between the process of the multi function device 26 receiving data from exterior network and the process of outputting or printing the received data. For example, the data format or the display size of the received data may be converted before specifying the type of received data. In this case, the type of received data would be specified based on the converted format thereof.

Furthermore, in the embodiments above, the output process and the print process are performed by a multi function device 26 in which the print device 44 is built-in. However, the techniques disclosed in the above embodiments do not need to be performed by an information processing device that includes a printer. For example, a personal computer (PC) could perform the aforementioned techniques. In this case, a printer is connected to the personal computer. The personal computer specifies the type of data which it receives. Then, in accordance with the type specified, the personal computer is able to process either of the process of outputting the received data to the portable device 48, or ordering the printer to print the received data.

The various techniques disclosed in the embodiments above will be described below with reference to FIG. 1. The information processing device 2 may further include a contents data demanding device 16, a data storage 18, an available memory size retrieving device 12, and a combination data retrieving device 14. The information processing device 2 is to be connected with a portable device 22.

Generally, the data size of which the portable device 22 is able to store is limited. Coincidentally, the sizes of the data received by the information processing device 2 vary. As a matter of course, all of the received data may not be small enough to be sent and be stored in the portable device 22. For example, as for the text data, there is high possibility that it is data small enough in size to be stored in the portable device. However, as for the image data, there is a higher possibility of being too large to be stored in the portable device 22. Hence, the specifying device 6 may specify whether the received data is of a text type or an image type. Then, the process controller 8 may control the data output processing device 10 and the print processing device 20 such that the output process is executed on the received data of text type, while the print process is executed on the received data of image type. The information processing device 2 may be able to alter the output formats of the received data in accordance with the specified type of received data. By the alteration of the output format, the information processing device 2 is able to meet with the intention of the user, or the functions with which the connected portable device 22 is equipped.

Furthermore, the type of data received by the data receiving device 4 may be specified by its data size. In this case, the specifying device 6 specifies the data size of the received data, and the process controller 8 may control the output processing device 10 and the print processing device 20 in accordance with the specified data size of the received data. Either the output process or the print process is executed on the received data in accordance with its data size. Moreover, the specified data size may be compared with a predetermined data size (that is, a criteria thereof). Undesirable conditions can be prevented, such as the required time to complete the output process becoming elongated.

The information processing device 2 may include the available memory size retrieving device 12. The available memory size retrieving device 12 may retrieve an available memory size of the portable device 22. In this case, the process controller 8 may control the output processing device 10 to execute the output process when the data size of the received data specified by the specifying device 6 is smaller than the available memory size retrieved by the available memory size retrieving device 12. Furthermore, the process controller 8 may control the print processing device 20 to execute the print process when the data size of the received data specified by the specifying device 6 is larger than the available memory size retrieved by the available memory size retrieving device 12. In this case, the output format of the received data can be altered in accordance with the ability of portable device 22 to store the received data. Undesirable conditions can be prevented, such as the portable device 22 not being able to store the received data sent to it.

Furthermore, the information processing device 2 may include the data storage 18 that stores a plurality of combinations of a type of received data and a type of process to be executed. In the combination data, a combination of a type of received data and a type of process to be executed is assigned. After the type of received data is specified by the specifying device 6, the process controller 8 may determine the type of process combined with the type of received data that is specified. Then, the process controller 8 may control the output processing device 10 and the print processing device 20, in accordance with the aforementioned combination data, such that either the output process or the print process is executed. The format in which the type of received data and the type of process to be executed is combined is not restricted to the aforementioned case. For example, the data storage 18 may store a combination of a type of received data and an instruction that orders the execution of a certain type of process on received data of the assigned type.

The information processing device 2 may be able to store a combination of the type of received data of which the user desires to carry along in the portable device 22 and the output process. Furthermore, a combination of the type of received data which the user desires to print out and the print process may be stored in the data storage 18. In this case, the received data is either outputted or printed in accordance with the intention of the user. The output format of the received data can be altered in accordance with the intention of the user.

Furthermore, the information processing device 2 may include the combination data retrieving device 14 that retrieves combination data from the portable device 22. As was explained earlier, the combination data may include a plurality of combinations of a type of received data and a type of process to be executed. In this case, the portable device 22 is able to store a combination of the type of received data which the user desires to carry along in the portable device 22 and the output process. Furthermore, a combination of the type of received data of which the user desires to print out and the print process can be stored in the portable device 22. The process controller 8 may control the output processing device 10 and the print processing device 20 in accordance with the combination data retrieved from the portable device 22. The output format of the received data can be altered in accordance with the intention of the user.

The type of device which sends the received data to the information processing device 2 is not restricted. For example, the information processing device 2 may be connected with a server 24 via the Internet. To materialize such a configuration, the information processing device 2 may include the contents data demanding device 16 that demands contents data to the server 24. The contents data may include first data and second data; that is, the contents data may include a plurality of data. In this case, the data receiving device 4 may receive the contents data sent from the server 24, and the specifying device 6 may specify whether the data included in the received contents data is either the first data or the second data. In accordance with the specified type of contents data, the process controller 8 may control the output processing device 10 to execute the process of outputting the first data and the print processing device 20 to execute the process of printing the second data.

Furthermore, the technique disclosed in this specification may be materialized in a computer readable medium for an information processing device 2 to be connected with a portable device 22. In this case, the computer readable medium may include instructions for ordering a computer mounted on the information processing device 2 to perform a specifying process of a type of received data; and an executing of either a process of outputting the received data to the portable device or a process of printing the received data in accordance with the specified type of the received data. As the result of the aforementioned computer readable medium and for the computer to work in harmony and process the instructions, the output format of the received data can be altered to meet the intention of the user, or the functions with which the portable device 22 is equipped.

Furthermore, the information processing device 2 does not have to execute either the output process or the print process. For example, depending on the type of received data, neither of the output process nor the print process may be executed.

Moreover, various criteria to determine the process to be executed, for example, (A) the received data being a text type or an image type, and (B) the data size of the received data being smaller or larger than a predetermined data size, are described above. The aforementioned various criteria can each be applied as an independent technique, as well as in combination as in the fifth embodiment. However, the combination of criteria is not restricted to the manner described in the fifth embodiment. For example, the information processing device may specify (1) the type of received data as being a text type or an image type, and (2) execute a print process in a case where the received data is specified as the image type, then (3) further specify the data size of the received data that is specified as being the text type. (4) The print process may be executed on the received data of text type in a case where the data size is larger than a predetermined data size. Furthermore, (5) the output process may be executed on the received data of text type in a case where the data size is smaller than a predetermined data size. In this case, the execution of the aforementioned processes of (3) to (5) is equivalent to the specifying device specifying the data size of the received data. The process controller may control the output processing device and the print processing device in accordance with the data size of the received data specified by the specifying device such that either the output process or the print process is executed.

The information processing device may execute a process of specifying the data size of the received data; execute the output process of outputting the received data to the portable device in a case where the specified data size of the received data is smaller than a predetermined data size; and execute the print process of printing the received data in a case where the specified data size of the received data is larger than the predetermined data size.

The information processing device may be included in a multi function device. The multi function device is equipped with at least a printing function.

The multi function device may store a demand requirement that designates certain contents data to be sent from a server. The demand requirement may include elements for designating the contents data, such as keywords, classes, or the like, concerning certain contents data.

Specific examples were described in detail above, however these are simply illustrations, and do not limit the scope of the claims. The specific examples illustrated above include various modifications and changes that are within the technology disclosed in the present specification. In addition, the technological components described in the present specification or the drawings exhibit technological utility individually or in various combinations, and are not limited to the combinations disclosed in the claims at the time of application. Furthermore, the technology illustrated in the present specification or the drawings may simultaneously achieve a plurality of objects, and has technological utility by achieving one of these objects.

What is claimed is:

1. A printer to be connected with a portable device, the printer comprising:
    a processor; and
    memory storing computer-readable instructions that, when executed, cause the processor to provide:
        a data receiving unit that receives data that is printable by the printer;
        a sending processing unit configured to execute a sending process of sending the received data to the portable device for displaying by the portable device;
        a print processing unit configured to execute a print process that causes printing of the received data at the printer itself;
        a specifying unit that specifies a type of the received data as being a text type or an image type, and further specifies a data size of the received data if the specified type of the received data is the image type; and
        a process controller unit that controls the sending processing unit and the print processing unit, wherein:
            in a case that the received data is of the text type, the process controller unit controls the sending processing unit to execute the sending process of sending the text type received data to the portable device for displaying by the portable device, and
            in a case that the type of the received data specified by the specifying unit is the image type, the specifying unit further specifies the data size of the received data,
            in a case that the specified data size of the image type received data is equal to or smaller than a predetermined data size, the process controller unit controls the sending processing unit to execute the sending process of sending the image type received data to the portable device for displaying by the portable device, and
            in a case that the specified data size of the image type received data is larger than the predetermined data size, the process controller unit controls the print processing unit to execute the print process that causes printing of the received data at the printer itself.

2. The printer of claim 1, further comprising:
    an available memory size retrieving unit that retrieves an available memory size of the portable device, wherein the available memory size retrieved by the available memory size retrieving unit is used as the predetermined data size.

3. The printer of claim 1, further comprising:
    a data storage that stores a plurality of combinations of a type of received data and a type of process to be executed,
    wherein the process controller unit determines a type of process combined with the type of the received data specified by the specifying unit, and controls the sending processing unit and the print processing unit in accordance with the determined type of the process such that either the sending process or the print process is executed.

4. The printer of claim 1, further comprising:
- a combination data retrieving unit that retrieves combination data from the portable device, the combination data including a plurality of combinations of a type of received data and a type of process to be executed,
- wherein the process controller unit determines a type of process combined with the type of the received data specified by the specifying unit, and controls the sending processing unit and the print processing unit in accordance with the determined type of the process such that either the sending process or the print process is executed.

5. The printer of claim 1, wherein the printer is configured to be connected with a server via the Internet, wherein
- the memory stores additional computer-readable instructions that, when executed, further cause the processor to provide a contents data demanding unit that sends a demand for contents data to the server, the contents data including text data and image data that is printable by the printer,
- the data receiving unit receives the contents data sent from the server,
- the specifying unit specifies whether each piece of the data included in the received contents data is the text data or the image data,
- the specifying unit further specifies data size of the image data,
- the process controller unit controls the sending processing unit to execute the sending process of sending the text data,
- the process controller unit controls the sending processing unit to execute the sending process of sending the image data if the specified data size of the image type received data is equal to or smaller than the predetermined data size, and
- the process controller unit controls the print processing unit to execute the print process of printing the image data if the specified data size of the image type received data is larger than the predetermined data size.

6. The printer of claim 1,
- wherein the data receiving unit receives the data if the portable device is connected to the printer.

7. The printer of claim 1, wherein whether the process controller unit:
- controls the sending processing unit to execute the sending process of sending the image type received data to the portable device for displaying by the portable device, or
- controls the print processing unit to execute the print process that causes printing of the image type received data at the printer itself,
- is based exclusively on the specified data size of the image type received data.

8. A non-transitory computer readable medium having computer-readable instructions stored thereon that, when executed, cause a computing device to:
- specify a type of received data that is printable by a printer as being of a text type or an image type;
- in a case that the received data is of a text type, execute a sending process of sending the text type received data to a portable device connected to the printer for displaying, by the portable device, the text type received data;
- in a case that the specified type of the received data is the image type, further specify a data size of the image type received data;
- in a case that the specified data size of the image type received data is equal to or smaller than a predetermined data size, execute the sending process of sending the image data to the portable device for displaying by the portable device, and
- in a case that the specified data size of the image type received data is larger than the predetermined data size, execute a print process of printing the image type received data at the printer itself.

9. The non-transitory computer readable medium of claim 8, further comprising computer-readable instructions stored thereon that, when executed, cause a computing device to use the specified data size of the image type received data as the exclusive basis for:
- executing the sending process of sending the image type received data to the portable device for displaying by the portable device, or
- executing the print process that causes printing of the image type received data at the printer itself.

* * * * *

UNITED STATES PATENT AND TRADEMARK OFFICE
CERTIFICATE OF CORRECTION

PATENT NO. : 8,477,337 B2  
APPLICATION NO. : 12/003553  
DATED : July 2, 2013  
INVENTOR(S) : Takao Seki Page 1 of 1

It is certified that error appears in the above-identified patent and that said Letters Patent is hereby corrected as shown below:

TITLE PAGE: ITEM 73
Please delete "Brother Kogyho Kabushiki Kaisha" and insert --Brother Kogyo Kabushiki Kaisha--

Signed and Sealed this  
Twenty-second Day of December, 2015

Michelle K. Lee  
*Director of the United States Patent and Trademark Office*